(12) United States Patent
Chen (10) Patent No.: US 8,700,820 B2
(45) Date of Patent: Apr. 15, 2014

(54) METHOD FOR ACCESSING USB DEVICE ATTACHED TO HOME GATEWAY, HOME GATEWAY AND TERMINAL

(75) Inventor: Bichao Chen, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 18 days.

(21) Appl. No.: 12/975,793

(22) Filed: Dec. 22, 2010

(65) Prior Publication Data

US 2011/0153879 A1    Jun. 23, 2011

(30) Foreign Application Priority Data

Dec. 22, 2009   (CN) .......................... 2009 1 0254366

(51) Int. Cl.
*G06F 3/00*    (2006.01)
*G06F 13/12*    (2006.01)

(52) U.S. Cl.
USPC .............................................. 710/36; 710/62

(58) Field of Classification Search
None
See application file for complete search history.

(56) References Cited

U.S. PATENT DOCUMENTS

| 2004/0090984 | A1 | 5/2004 | Saint-Hilaire et al. |
| 2005/0216603 | A1 | 9/2005 | Michaud |
| 2007/0250623 | A1 | 10/2007 | Hickey et al. |
| 2008/0147909 | A1 | 6/2008 | Zhang et al. |
| 2009/0303521 | A1* | 12/2009 | Kumar .......................... 358/1.15 |
| 2010/0172362 | A1 | 7/2010 | Zhou et al. |

FOREIGN PATENT DOCUMENTS

| CN | 101094206 A | 12/2007 |
| CN | 101312422 A | 11/2008 |
| CN | 101599970 A | 12/2009 |
| EP | 2 061 195 A1 | 5/2009 |
| WO | 2007/095375 A2 | 8/2007 |

OTHER PUBLICATIONS

European Search Report dated Mar. 9, 2011 in corresponding European Patent Application 10196560.6.
International Search Report issued Mar. 31, 2011 in corresponding International Search Report PCT/CN2010/080087.
Chinese Office Action mailed Dec. 19, 2011 issued in corresponding Chinese Patent Application No. 200910254366.0.

(Continued)

*Primary Examiner* — Idriss N Alrobaye
*Assistant Examiner* — David Martinez
(74) *Attorney, Agent, or Firm* — Staas & Halsey LLP (57) ABSTRACT

A method for accessing a Universal Serial Bus (USB) device attached to the home gateway is provided to solve the problem that after the USB device is attached to the home gateway, the USB device becomes an exclusive device of the home gateway, and application software on a personal computer (PC) or other terminals can not be directly used to transparently access the USB device. The method includes: receiving a USB message of the USB device attached to the home gateway; and adapting the USB message to a network packet and sending the network packet to a virtual USB device interface of a terminal to be read by an application program of the terminal; or parsing a network packet sent by the terminal through the virtual USB device interface into a USB data frame and writing the USB data frame into the USB device. Thereby, the terminal may make full use of abundant application software (application programs) to transparently access a real USB device attached to the home gateway, and implement various functions of the USB device, without requiring the home gateway to implement one service access function for each type of USB devices.

7 Claims, 4 Drawing Sheets

(56) References Cited

OTHER PUBLICATIONS

European Office Action dated Mar. 27, 2012 issued in corresponding European Patent Application No. 10196560.6.

English Translation of the PCT Written Opinion of the International Search Authority mailed Mar. 31, 2011 in corresponding International Patent Application No. PCT/CN2010/080087 (4 pages).

European Office Action mailed Jul. 26, 2013 in corresponding European Patent Application No. 10 196 560.6-1860 (4 pages).

* cited by examiner

METHOD FOR ACCESSING USB DEVICE ATTACHED TO HOME GATEWAY, HOME GATEWAY AND TERMINAL

CROSS-REFERENCE TO RELATED APPLICATION

This application claims priority to Chinese Patent Application No. 200910254366.0, filed on Dec. 22, 2009, which is hereby incorporated by reference in its entirety.

FIELD OF THE INVENTION

The present invention relates to the field of access network, and more particularly to a method for accessing a Universal Serial Bus (USB) device attached to a home gateway, a home gateway and a terminal.

BACKGROUND OF THE INVENTION

A home gateway represents a centralized intelligent interface and may receive communication signals from different external networks and transmit the signals to a certain intelligent device through a home network; therefore, the home gateway is a connecting bridge and portal between the home internal network and the external networks. As for a common home gateway, the interface type of the user side includes an ordinary Ethernet interface, an ordinary phone interface, a wireless local area network (LAN) interface and an infrared data interface. As for an enhanced home gateway having a USB host interface, the function of the home network is extended by attaching USB devices such as a USB flash drive, a USB camera or a USB printer, thereby largely improving the status of the home gateway as the core device of the home network.

However, once the USB device is attached to the home gateway, the USB device becomes an exclusive device of the home gateway. A terminal such as a personal computer (PC) can not directly access the USB device attached to the home gateway, unless the home gateway has specific sharing and access software or other functional software. For example, after the USB flash drive is connected to the home gateway, the PC can access the USB flash drive through a File Transport Protocol (FTP) only if the home gateway can be supported as a FTP Server; or the PC can access the USB flash drive through a Server Message Block (SMB) protocol if the home gateway supports a Samba function. The foregoing methods are based on a client/server (C/S) access mode, and the PC or other terminals can not transparently access the USB device attached to the home gateway. For another example, after a High Speed Packet Access (HSPA) data card is connected to the gateway, the HSPA data card may usually be used to access the Internet and implement a Circuits Switch (CS) domain voice function. However, since the gateway does not provide any user interface, the HSPA data card needs to be connected to the PC, in order to realize a messaging function through background software in the PC.

That is to say, according to the access mode of the conventional art, although many types of USB devices have abundant application software on the PC platform, the USB device becomes an exclusive device of the home gateway once the USB device is attached to the home gateway, and the application software can not be used directly to access the USB device attached to the home gateway transparently.

SUMMARY OF THE INVENTION

Accordingly, the present invention is directed to a method for accessing a USB device attached to a home gateway and a home gateway, so as to solve the problem that after the USB device is attached to the home gateway, the USB device becomes an exclusive device of the home gateway, and application software in terminals, such as a PC, can not be used to directly access the USB device transparently.

In an embodiment, the present invention provides a method for accessing a USB device attached to a home gateway, which includes:

receiving a USB message of the USB device attached to the home gateway, wherein the USB message comprises a first USB data frame, a real plug-in event message of the USB device and/or a real removal event message of the USB device; and adapting the USB message to a first network packet and sending the first network packet to a virtual USB device interface of a terminal to be read by an application program of the terminal; or parsing a second network packet sent by the terminal through the virtual USB device interface into a second USB data frame and writing the second USB data frame into the USB device.

In an embodiment, the present invention provides a method for accessing a USB device attached to a home gateway, which includes:

receiving, by a terminal, a first network packet from the home gateway;

parsing the first network packet to obtain a USB message and transmitting the USB message to a virtual USB device interface of the terminal, wherein the USB message comprises a first USB data frame, a real plug-in event message of the USB device and/or a real removal event message of the USB device;

reading, by an application program of the terminal, the first USB data frame through the virtual USB device interface, or writing data through the virtual USB device interface; and adapting the data written through the virtual USB device interface to a second network packet and sending the second network packet to the home gateway.

In an embodiment, the present invention provides a home gateway, which includes:

a receiving module, configured to receive a Universal Serial Bus (USB) message of a USB device attached to the home gateway, wherein the USB message comprises a first USB data frame, a real plug-in event message of the USB device and/or a real removal event message of the USB device; and an adapting and parsing module, configured to adapt the USB message received by the receiving module to a first network packet and send the first network packet to a virtual USB device interface of a terminal to be read by an application program of the terminal; or parse a second network packet sent by the terminal through the virtual USB device interface into a second USB data frame and write the second USB data frame into the USB device.

In an embodiment, the present invention further provides a terminal, which includes:

a receiving module, configured to receive a first network packet from the home gateway;

a parsing module, configured to parse the first network packet to obtain a USB message and transmit the USB message to a virtual USB device interface of the terminal, wherein the USB message comprises a first USB data frame, a real plug-in event message of the USB device and/or a real removal event message of the USB device;

a data reading and writing module, configured to enable an application program of the terminal to read the first USB data frame through the virtual USB device interface or write data through the virtual USB device interface; and an adapting module, configured to adapt the data written through the virtual USB device interface to a second network packet and send the second network packet to the home gateway.

In the embodiments of the present invention, a USB message of the USB device attached to the home gateway is received; and the USB message is adapted into a network packet, and the network packet is sent to a virtual USB device interface of a terminal; or a network packet sent by an application program of the terminal through the virtual USB device interface is parsed into a USB data frame, and the USB data frame is written into the USB device. In the embodiments of the present invention, since the terminal may write or read the USB message through the virtual USB device interface, and interact with the home gateway after the adapting or parsing process, the USB device attached to the home gateway is no longer an exclusive device of the home gateway, and the terminal may make full use of abundant application software (application programs) to transparently access a real USB device attached to the home gateway, and implement various functions of the USB device, without requiring the home gateway to implement one service access function for each type of USB devices.

DETAILED DESCRIPTION OF THE EMBODIMENTS

The present invention provides a method for accessing a USB device attached to the home gateway, which includes: receiving a USB message of the USB device attached to the home gateway; and adapting the USB message to a network packet and sending the network packet to a virtual USB device interface of a terminal; or parsing a network packet sent by an application program of the terminal through the virtual USB device interface into a USB data frame and writing the USB data frame into the USB device. The present invention further provides a corresponding home gateway and a terminal. Detailed description is given in the following.

Figure 1:
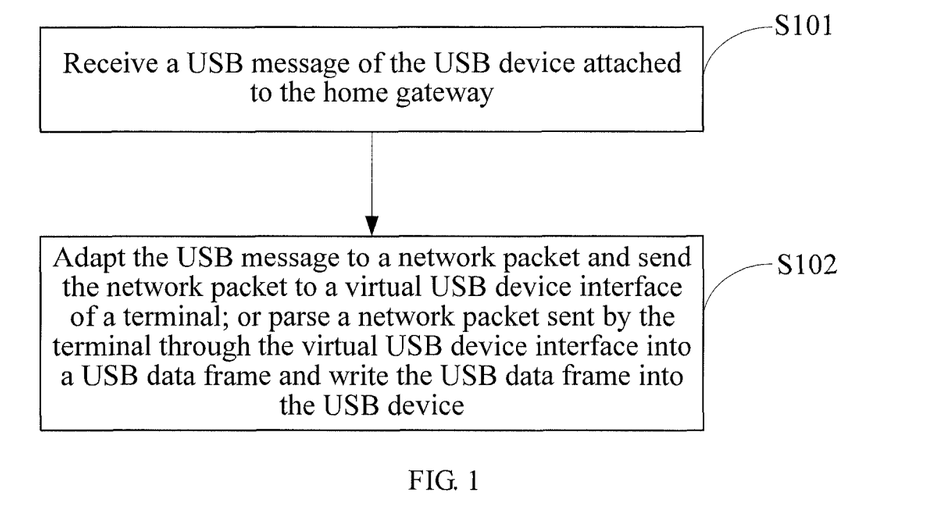
FIG. 1 is a schematic flow chart of a method for accessing a USB device attached to the home gateway according to a first embodiment of the present invention.

FIG. 1 is a schematic flow chart of a method for accessing a USB device attached to the home gateway according to a first embodiment of the present invention. Referring to FIG. 1, the method mainly includes the following steps.

In Step S101, a USB message of the USB device attached to the home gateway is received.

In the embodiment of the present invention, the USB device attached to the home gateway may be a USB flash drive, a USB camera or a USB printer. When a real USB device, such as the foregoing devices, is plugged into or removed from a USB device interface of the home gateway or application data flows through the USB device interface, a USB drive module of the home gateway will receive one or more USB messages, such as a USB data frame, a real plug-in event message of the USB device and/or a real removal event message of the USB device.

In Step S102, the USB message is adapted into a network packet and the network packet is sent to a virtual USB device interface of a terminal; or a network packet sent by the terminal through the virtual USB device interface is parsed into a USB data frame and the USB data frame is written into the USB device.

Since the home gateway communicates with the terminal through a communication protocol such as a Transmission Control Protocol (TCP), an Internet Protocol (IP) or a User Datagram Protocol (UDP), but the USB message is not suitable for transmission on a communication link of the foregoing protocols, the USB message may be firstly adapted into a network packet and then the network packet is sent to the virtual USB device interface of the terminal through the communication link of one of the foregoing protocols to be read by the application program of the terminal; or a network packet sent by the terminal through the virtual USB device interface is parsed into a USB data frame and the USB data frame is written into the USB device. Obviously, the USB data frame obtained by parsing is written into the USB device through the USB drive module of the home gateway. In the embodiment of the present invention, the terminal may be a device having a computing function or an intelligent device different from the USB device, such as a PC, a portable computer or a mobile terminal (a mobile phone).

In the embodiment of the present invention, the meaning of the virtual USB device interface lies in that the terminal may transparently access a real USB device attached to the home gateway, that is, a user may access the real USB device attached to the home gateway as if the user accesses a real USB device attached to the terminal without feeling the existence of the real USB device.

Generally, a plurality of terminals may be connected to the home gateway. In order to realize sharing of the USB device by a plurality of terminals and avoid the influence on the sharing of the USB device by other terminals when one of the terminals is disconnected from the shared USB device, the home gateway may generate a virtual plug-in event message or a virtual removal event message of the USB device in the embodiment of the present invention. Thus, when the USB device is connected to the home gateway (that is, the USB device is really attached to the home gateway), the home gateway may adapt the virtual plug-in event message or the virtual removal event message to a network packet and send the network packet to the terminal. After the terminal obtains the virtual plug-in event message or the virtual removal event message by parsing the network packet, the terminal executes a virtual plug-in operation of the USB device or a virtual removal operation of the USB device, thereby achieving connection or disconnection between the terminal and the USB device.

Since both the terminal and the home gateway may access the USB device attached to the home gateway, in order to prevent an access conflict of the terminal and the home gateway to the USB device, in the embodiment of the present invention, a user may pre-configure an access policy, and the home gateway executes the pre-configured access policy to control the access of the terminal and the home gateway to the USB device. The access policy may be configured according to service parameters or scenario conditions, in which the service parameters or scenario conditions include a logical interface of the USB device, a type of the USB device and access priorities of the terminal and the home gateway to the USB device. The access policy includes an exclusive access of the home gateway to the USB device, an exclusive access of the terminal to the USB device, a prior access of the home gateway to the USB device, a prior access of the terminal to the USB device and a simultaneous shared access of the home gateway and the terminal to the USB device.

As an embodiment of the present invention, a rule list may be formed when the access policy is configured. In the rule list, each rule includes a matching condition and an access policy. The matching conditions may be the service parameters or scenario conditions in the foregoing description. That is, the logical interface of the USB device, the type of the USB device and the access priorities of the terminal and the home gateway to the USB device. When an access operation occurs, a rule in the rule list is matched according to the matching condition. Once a certain rule is matched, whether to allow the execution of the access operation is determined according to the access policy of the rule.

In the embodiment of the present invention, the access policy may be configured in the following situations.

1) If the USB device has a plurality of logical interfaces, a set of independent access policies may be configured for each logical interface.

2) The access policy is configured according to the type of the USB device. For example, different types of USB devices such as a USB flash drive, a USB camera and a USB printer may be configured with different access policies, including, but not limited to, an access policy of "simultaneous shared access of the home gateway and the terminal" for the USB flash drive, and an access policy of "exclusive access of the home gateway" for the USB camera.

3) The access policy is configured according to the access priorities of the terminal and the home gateway to the USB device, that is, when the home gateway and an application program of the terminal access a USB device at the same time, it is determined, according to the pre-configured priorities, whether the home gateway or the terminal accesses the USB device first. For example, when the access policy is configured as "prior access of the home gateway to the USB device", the terminal can not access the USB device when the home gateway uses the USB device. Even if the terminal uses the USB device before the home gateway accesses the USB device, the terminal still needs to release the access to the USB device, such that the home gateway can access the USB device.

Since the access order of the home gateway and the terminal to the USB device attached to the home gateway may be flexibly controlled by configuring the access policy, the present invention effectively prevents the access conflict of the terminal and the home gateway to the USB device and realizes the sharing of the USB device by the home gateway and the terminal.

In the embodiment of the present invention, the home gateway or the terminal may further uni-cast or broadcast a detection packet to detect whether a network to which the home gateway belongs has another home gateway or terminal capable of sharing the USB device. Specifically, after power on and initialization of the system, the home gateway and the terminal broadcast or uni-cast a detection packet to a specific protocol port in the network. When another home gateway or terminal running in the network and capable of sharing the USB device receives the detection packet, the another home gateway or terminal replies with an acknowledgement packet in time. In the acknowledgement packet contains a type of the another home gateway or terminal. The home gateway or the terminal broadcasting or uni-casting the detection packet establishes a communication relation for USB sharing after receiving the acknowledgement packet.

Figure 2:
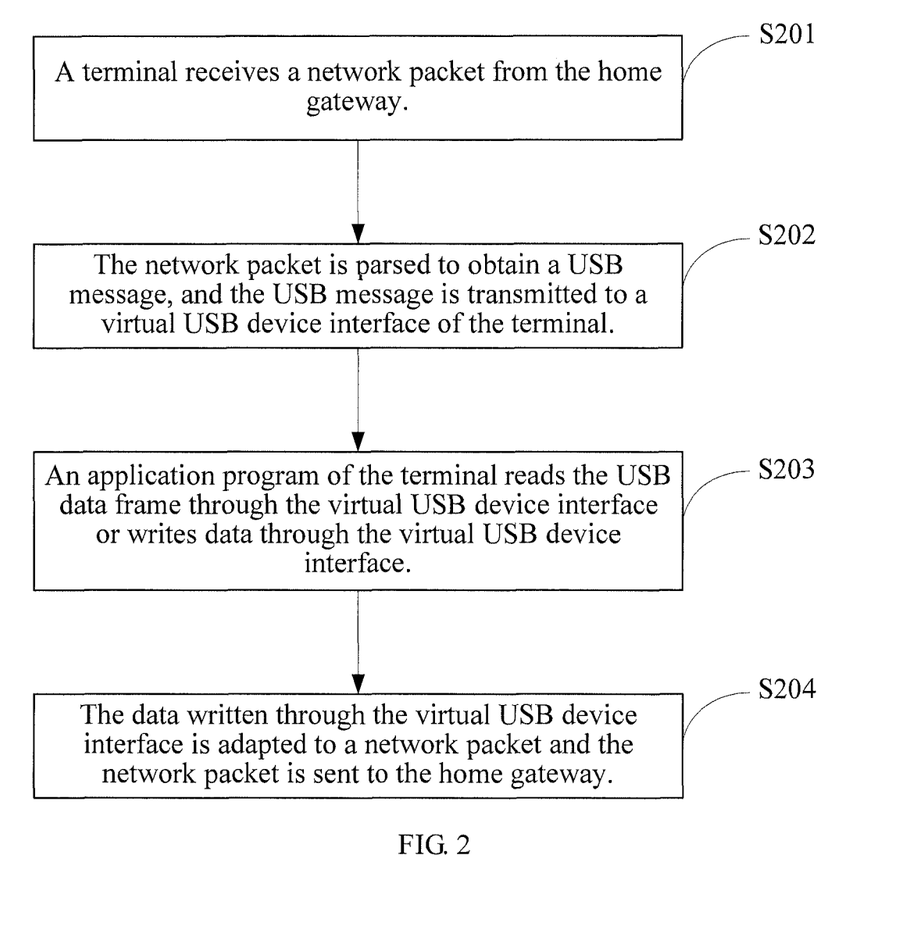
FIG. 2 is a schematic flow chart of a method for accessing a USB device attached to the home gateway according to a second embodiment of the present invention.

FIG. 2 is a schematic flow chart of a method for accessing a USB device attached to the home gateway according to a second embodiment of the present invention. Referring to FIG. 2, the method mainly includes the following steps.

In Step S201, a terminal receives a network packet from the home gateway.

In the embodiment of the present invention, the terminal may be a device having a computing function or an intelligent device different from the USB device, such as a PC, a portable computer or a mobile terminal (a mobile phone).

In Step S202, the network packet is parsed to obtain a USB message, and the USB message is transferred to a virtual USB device interface of the terminal.

Since the home gateway communicates with the terminal through a communication protocol such as a TCP, an IP or a UDP, but the network packet sent from the home gateway can not be read by an application program of the terminal, the network packet sent from the home gateway may be firstly parsed to obtain a USB message and then the USB message is transmitted to the virtual USB device interface of the terminal. In the embodiment of the present invention, the USB message includes a USB data frame, a real plug-in event message of the USB device and/or a real removal event message of the USB device.

In Step S203, an application program of the terminal reads the USB data frame through the virtual USB device interface or writes data through the virtual USB device interface.

In the embodiment of the present invention, the virtual USB device interface is different from a physical USB device interface on the terminal, because no real USB device is attached to the terminal at this time. The meaning of the virtual USB device interface lies in that the terminal may transparently access a real USB device attached to the home gateway, that is, a user may access the real USB device attached to the home gateway as if the user accesses a real USB device attached to the terminal without feeling the existence of the real USB device. Due to the existence of the virtual USB device interface, the terminal may make full use of abundant application software (application programs) to access the USB device attached to the home gateway, so that various functions of the USB device are implemented.

In Step S204, the data written through the virtual USB device interface is adapted to a network packet and the network packet is sent to the home gateway.

As described above, since the USB message is not suitable for direct transmission on a communication link based on a protocol such as TCP, IP or UDP, the data written through the virtual USB device interface needs to be adapted to a network packet in the terminal, and then the network packet is sent to the home gateway through the communication link based on the foregoing protocol.

Generally, a plurality of terminals may be connected to the home gateway. In order to realize sharing of the USB device by a plurality of terminals and avoid the influence on the sharing of the USB device by other terminals when one of the terminals is disconnected from the shared USB device, the home gateway may generate a virtual plug-in event message or a virtual removal event message of the USB device when the USB device is connected to the home gateway (that is, the USB device is really attached to the home gateway) in the embodiment of the present invention. The virtual event messages are also transmitted to the terminal in the form of a network packet. That is to say, the USB message obtained by parsing the network packet by the terminal further includes the virtual plug-in event message of the USB device and/or the virtual removal event message of the USB device.

Thus, after the terminal obtains the virtual plug-in event message or the virtual removal event message by parsing the network packet, the terminal executes a virtual plug-in operation of the USB device or a virtual removal operation of the USB device, thereby achieving connection or disconnection between the terminal and the USB device.

It may be known from the foregoing embodiment that although the USB device is attached to the home gateway, the USB device is not an exclusive device of the home gateway, and the terminal may write or read the USB message through the virtual USB device interface, and after the adapting or parsing process, the terminal may make full use of abundant application software (application programs) to access the USB device attached to the home gateway, so that various functions of the USB device are implemented.

Figure 3:
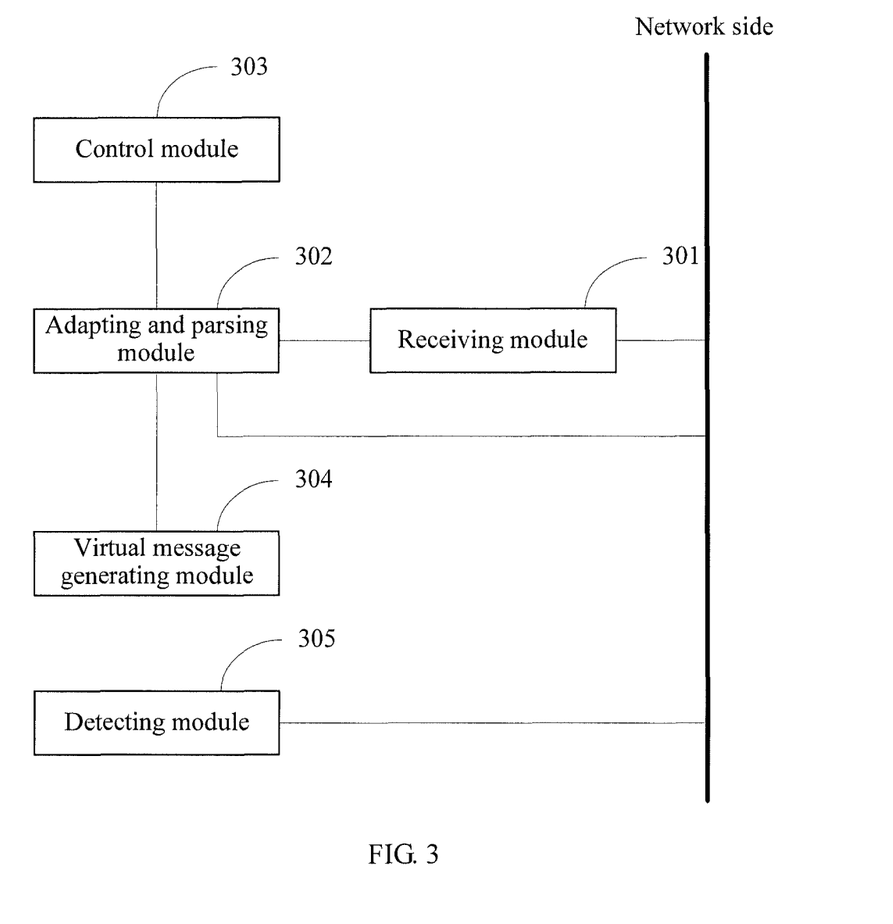
FIG. 3 is a schematic view of a logical structure of a home gateway according to a third embodiment of the present invention.

FIG. 3 is a schematic view of a basic logical structure of a home gateway according to a third embodiment of the present invention. In order to facilitate description, only parts related to the embodiment of the present invention are shown. Referring to FIG. 3, the home gateway includes a receiving module 301 and an adapting and parsing module 302.

The receiving module 301 is configured to receive a USB message of a USB device attached to the home gateway. In the USB message includes a USB data frame, a real plug-in event message of the USB device and/or a real removal event message of the USB device.

The adapting and parsing module 302 is configured to adapt the USB message received by the receiving module 301 into a network packet and send the network packet to a virtual USB device interface of a terminal to be read by an application program of the terminal; or parse the network packet sent by the terminal through the virtual USB device interface into a USB data frame and write the USB data frame into the USB device.

Since the home gateway communicates with the terminal through a communication protocol such as a TCP, an IP or a UDP, but the USB message is not suitable for transmission on a communication link of one of the foregoing protocol, the adapting and parsing module 302 may be firstly adopted to adapt the USB message to a network packet and then to send the network packet to the virtual USB device interface through the communication link of one of the foregoing protocol to be read by the application program of the terminal; or parse the network packet sent by the terminal through the virtual USB device interface into a USB data frame and write the USB data frame into the USB device. Obviously, the USB data frame obtained by parsing is written into the USB device through a USB drive module of the home gateway. In the embodiment, the terminal may be a device having a computing function or an intelligent device different from the USB device, such as a PC, a portable computer or a mobile terminal (a mobile phone).

Since both the terminal and the home gateway may access the USB device attached to the home gateway, in order to prevent an access conflict of the terminal and the home gateway to the USB device, in the embodiment of the present invention, the home gateway may further include a control module 303, configured to execute an access policy preconfigured by a user to control the access of the terminal and the home gateway to the USB device through the adapting and parsing module 302. The access policy may be configured according to service parameters or scenario conditions. The service parameters or scenario conditions include a logical interface of the USB device, a type of the USB device and access priorities of the terminal and the home gateway to the USB device; and the access policy includes an exclusive access of the home gateway to the USB device, an exclusive access of the terminal to the USB device, a prior access of the home gateway to the USB device, a prior access of the terminal to the USB device and a simultaneous shared access of the home gateway and the terminal to the USB device.

Generally, a plurality of terminals may be connected to the home gateway. In order to realize sharing of the USB device by a plurality of terminals and avoid the influence on the sharing of the USB device by other terminals when one of the terminals is disconnected from the shared USB device, a plug-in event or removal event of the USB device may be virtualized in the home gateway in the embodiment of the present invention. Further, a virtual message generating module 304 included in the home gateway generates a virtual plug-in event message of the USB device or a virtual removal event message of the USB device according to the virtualized plug-in event or removal event of the USB device. Thus, when the USB device is connected to the home gateway (that is, the USB device is really attached to the home gateway), the adapting and parsing module 302 may adapt the virtual plug-in event message or the virtual removal event message generated by the virtual message generating module 304 into a network packet and send the network packet to the terminal. After the terminal obtains the virtual plug-in event message or the virtual removal event message by parsing the network packet, the terminal executes a virtual plug-in operation of the USB device or a virtual removal operation of the USB device according to the virtual plug-in event message or the virtual removal event message, thereby achieving connection or disconnection between the terminal and the USB device.

In the embodiment, the home gateway further includes a detecting module 350, configured to uni-cast or broadcast a detection packet to detect whether a network to which the home gateway belongs has other home gateways or terminals capable of sharing the USB device.

It may be known from the foregoing embodiment that although the USB device is attached to the home gateway, the USB device is not an exclusive device of the home gateway, and the terminal may write or read the USB message through the virtual USB device interface, and after the adapting or parsing process, the terminal may make full use of abundant application software (application programs) of the terminal to access the USB device attached to the home gateway, so that various functions of the USB device are implemented.

Figure 4:
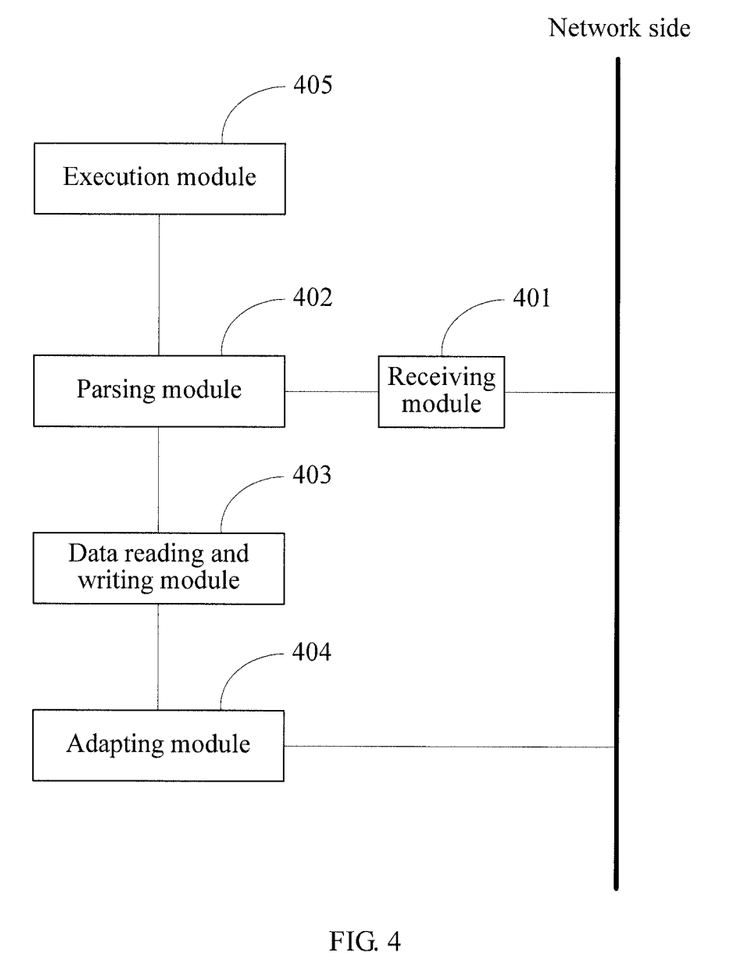
FIG. 4 is a schematic view of a logical structure of a terminal according to a fourth embodiment of the present invention.

FIG. 4 is a schematic view of a basic logical structure of a terminal according to a fourth embodiment of the present invention. In order to facilitate description, only parts related to the embodiment of the present invention are shown. The terminal may be a device having a computing function or an intelligent device different from the USB device, such as a PC, a portable computer or a mobile terminal (a mobile phone). The terminal includes a receiving module 401, a parsing module 402, a data reading and writing module 403 and an adapting module 404.

The receiving module 401 is configured to receive a network packet from a home gateway.

The parsing module 402 is configured to parse the network packet to obtain a USB message and transmit the USB message to a virtual USB device interface of the terminal.

Since the home gateway communicates with the terminal through a TCP, an IP or a UDP, the network packet sent from the home gateway can not be directly read by an application program of the terminal, the parsing module 402 may parse the network packet sent from the home gateway to obtain a USB message and transmit the USB message to the virtual USB device interface of the terminal. In the embodiment of the present invention, the USB message includes a USB data frame, a real plug-in event message of the USB device and/or a real removal event message of the USB device.

The data reading and writing module 403 is configured to enable an application program of the terminal to read the USB data frame through the virtual USB device interface or write data through the virtual USB device interface. The virtual USB device interface is different from a physical USB device interface on the terminal, because no real USB device is attached to the terminal at this time. The meaning of the virtual USB device interface lies in that the terminal may transparently access a real USB device attached to the home gateway, that is, a user may access the real USB device attached to the home gateway as if the user accesses a real USB device attached to the terminal without feeling the existence of the real USB device. Due to the existence of the virtual USB device interface, the terminal may make full use of abundant application software (application programs) to access the USB device attached to the home gateway, so that various functions of the USB device are implemented.

The adapting module 404 is configured to adapt the data written through the virtual USB device interface to a network packet and send the network packet to the home gateway.

Generally, a plurality of terminals may be connected to the home gateway. In order to realize sharing of the USB device by a plurality of terminals and avoid the influence on the sharing of the USB device by other terminals when one of the terminals is disconnected from the shared USB device, the home gateway may generate a virtual plug-in event message or a virtual removal event message of the USB device when the USB device is connected to the home gateway (that is, the USB device is really attached to the home gateway) in the embodiment of the present invention. The virtual event messages are also transmitted to the terminal in the form of a network packet. That is to say, the USB message obtained by parsing the network packet by the parsing module 402 further includes the virtual plug-in event message of the USB device and/or the virtual removal event message of the USB device. Thus, in the embodiment, the terminal further includes an execution module 405, configured to locally execute a virtual plug-in operation of the USB device and/or a virtual removal operation of the USB device after the parsing module 402 obtains the virtual plug-in event message of the USB device and/or the virtual removal event message of the USB device by parsing the network packet, thereby achieving connection or disconnection between the terminal and the USB device.

It may be known from the foregoing embodiment that although the USB device is attached to the home gateway, the USB device is not an exclusive device of the home gateway. The terminal may write or read the USB message through the virtual USB device interface. After the adapting or parsing process, the terminal may make full use of abundant application software (application programs) to access the USB device attached to the home gateway, and implement various functions of the USB device.

Persons of ordinary skill in the art should understand that all or a part of the steps of the method according to the embodiments of the present invention may be implemented by a program instructing relevant hardware. The program may be stored in a computer readable storage medium, such as a Read Only Memory (ROM), a Random Access Memory (RAM), a magnetic disk, or an optical disk.

A method for accessing a USB device attached to the home gateway, a home gateway, and a terminal of the present invention are described in the foregoing details. The principle and implementation of the present invention are described herein through specific examples. The description about the embodiments of the present invention is merely provided for ease of understanding of the method and core ideas of the present invention. Persons of ordinary skill in the art can make variations and modifications to the present invention in terms of the specific implementations and application scopes according to the ideas of the present invention. Therefore, the specification shall not be construed as a limit to the present invention.

What is claimed is:

1. A method for accessing, by a plurality of terminals, a Universal Serial Bus (USB) device attached to a home gateway, comprising:
   receiving by the home gateway a USB message of the USB device attached to the home gateway, wherein the USB message comprises a first USB data frame, and receiving a real plug-in event message of the USB device or a real removal event message of the USB device; and
   generating, by the home gateway, a virtual plug-in event message of the USB device according to a generated virtual plug-in event of the USB device, or generating, by the home gateway, a virtual removal event message of the USB device according to a generated virtual removal event of the USB device, while the USB device remains connected to the home gateway, thereby when one of the plurality of terminals is to disconnect from the USB device, an influence on sharing of the USB device by other connected terminals is avoided,
   wherein the generated virtual plug-in event message or the generated virtual removal event message are adapted to a first network packet for transmission to a terminal, and
   wherein the method further comprises one or more operations of:
      adapting the USB message to a second network packet and sending the second network packet to a virtual USB device interface for the terminal to be read by an application program of the terminal, or
      parsing a third network packet sent by a terminal through a virtual USB device interface for the terminal into a second USB data frame and writing the second USB data frame into the USB device.

2. The method for accessing the USB device attached to the home gateway according to claim 1, further comprising:
   executing an access policy pre-configured by a user to control access of the terminal and the home gateway to the USB device.

3. The method for accessing the USB device attached to the home gateway according to claim 2, wherein the access policy is configured according to service parameters or scenario conditions; the service parameters or scenario conditions comprise a logical interface of the USB device, a type of the USB device and access priorities of the terminal and the home gateway to the USB device; and the access policy comprises an exclusive access of the home gateway to the USB device, an exclusive access of the terminal to the USB device, a prior access of the home gateway to the USB device, a prior access of the terminal to the USB device and a simultaneous shared access of the home gateway and the terminal to the USB device.

4. The method for accessing a USB device attached to the home gateway according to claim 1, further comprising:
   uni-casting or broadcasting, by the home gateway or the terminal, a detection packet to detect whether a network to which the home gateway belongs has other home gateways or terminals capable of sharing the USB device.

5. A home gateway, comprising a processing device configured to:
  receive a Universal Serial Bus (USB) message of a USB device attached to the home gateway, wherein the USB message comprises a first USB data frame, a real plug-in event message of the USB device and a real removal event message of the USB device;
  adapt the received USB message to a first network packet and send the first network packet to a virtual USB device interface of a terminal to be read by an application program of the terminal; and parse a second network packet sent by the terminal through the virtual USB device interface into a second USB data frame and write the second USB data frame into the USB device; and
  generate a virtual plug-in event message of the USB device according to a virtual plug-in event of the USB device or generate a virtual removal event message of the USB device according to a virtual removal event of the USB device while the USB device remain connected to the home gateway, such that when one of a plurality of terminals is disconnected from the USB device, an influence on the sharing of the USB device by other terminals is avoided,
  wherein the processing device is further configured to adapt the virtual plug-in event message and the virtual removal event message into a third network packet and send the third network packet to the terminal.

6. The home gateway according to claim 5, wherein the processing device is further configured to execute an access policy pre-configured by a user to control access of the terminal and the home gateway to the USB device.

7. The home gateway according to claim 5,
  wherein the processing device is further configured to unicast or broadcast a detection packet to detect whether a network to which the home gateway belongs has other home gateways or terminals capable of sharing the USB device.

* * * * *